Feb. 14, 1967   R. J. HICKS   3,303,713
LOAD EQUALIZING MEANS FOR PLANETARY PINIONS
Filed Feb. 8, 1965   4 Sheets-Sheet 1

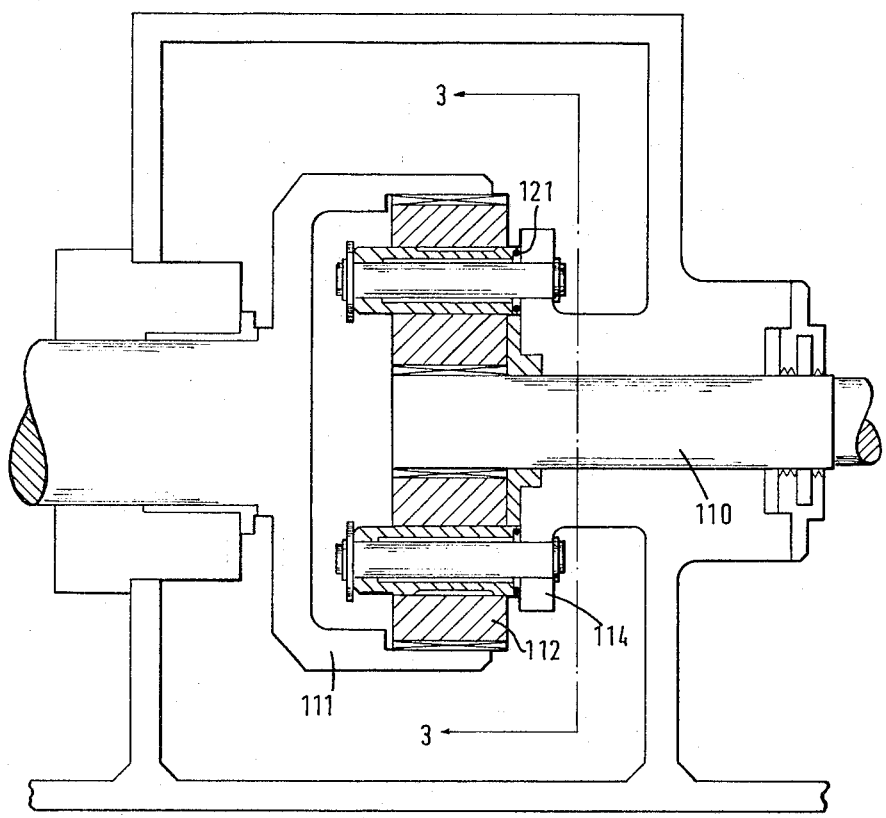

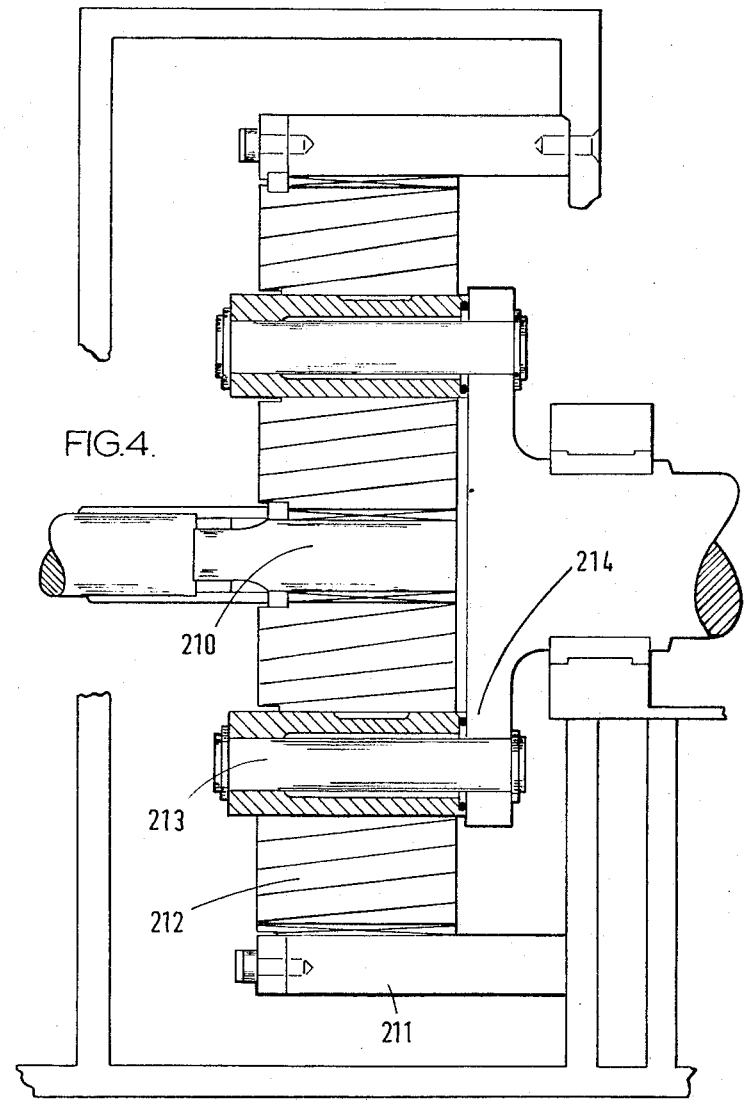

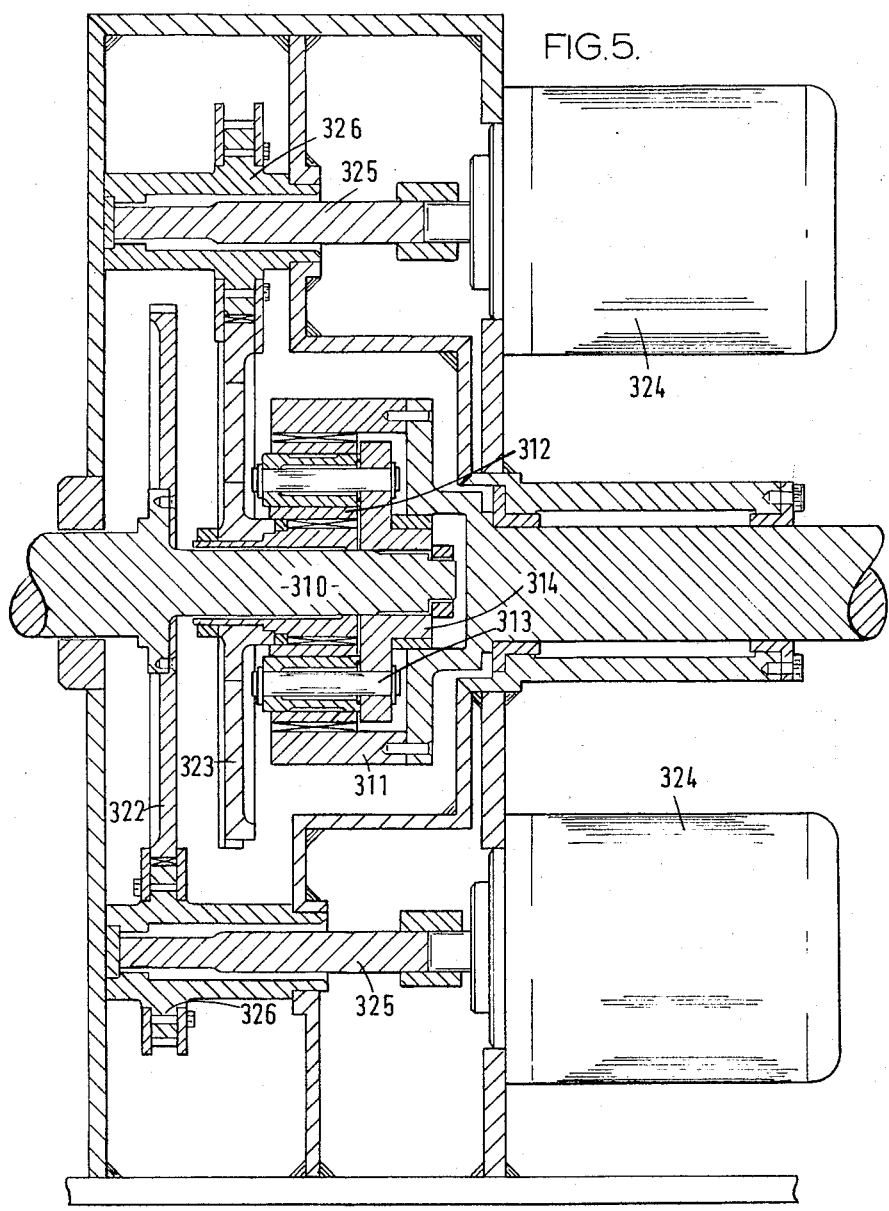

United States Patent Office 3,303,713
Patented Feb. 14, 1967

3,303,713
LOAD EQUALIZING MEANS FOR
PLANETARY PINIONS
Raymond J. Hicks, Eckington, near Pershore, England, assignor to National Research and Development Corporation, London, England, a corporation of Great Britain
Filed Feb. 8, 1965, Ser. No. 431,033
Claims priority, application Great Britain, Feb. 7, 1964, 5,269/64
2 Claims. (Cl. 74—411)

This invention relates to gears, whilst primarily concerned with epicyclic gears, particularly the support of planet wheels upon carriers, it is also applicable to other forms of parallel shaft mounted gear trains.

One difficulty in epicyclic gearing is that of ensuring sharing of the transmitted load between each of a plurality of planet wheels meshed with the common sun wheel and with an outer annulus gear. Any inaccuracies for example in machining bores in the carrier to receive the planet shafts will be reflected in unequal sharing of the load. Secondly as well as requiring extremely accurate machining it is usually considered desirable to provide axially spaced bearing points for each planet shaft, i.e. straddle bearings and the carrier is thus physically large and has windows through which the planets project; this limits the number of planets which may be used and further complicates manufacture.

The primary objects of the present invention are to reduce the necessary accuracy of machining, i.e. increase the permissable tolerances, whilst improving the unformity of load distribution upon each of the planet wheels of epicyclic gearing; the invention is or may be applicable to other forms of gearing.

In accordance with the present invention a gear wheel is located upon a co-axial shaft provided on a carrier, said shaft having opposite end portions effectively rigid with the gear wheel and the carrier respectively, there being a space provided to permit the shaft to flex so that the gear will locate with uniform loading.

Preferably a tubular sleeve is interposed between the gear and shaft, the sleeve having a smaller diameter bore portion which is fast with the shaft and a larger diameter bore portion which creates an annular space about the shaft in which the latter may deflect, the gear being located wholly about the larger diameter bore portion of the sleeve.

The theory on which the invention is predicated postulates that if the sleeve upon which the gear is mounted is absolutely rigid with the shaft, and the latter is absolutely rigid with the mounting, for example, a planet carrier, the shaft may flex between the two spaced points, i.e. the point at which the shaft contacts the sleeve and that at which it contacts the carrier. Assuming then that the resistance to flexing is equal at these points, i.e. the shaft is of uniform diameter, and that equal couples are produced to induce flexing, i.e. that the load applied to the gear effects equal and opposite moments about the said points (due to the centre of the gear being equidistant from said points), the flexing which occurs will take the axes of the shaft portions on opposite sides of said points out of co-axiality but into parallel: hence the gear will not be skewed, but displaced bodily and laterally to an amount which automatically places it in the best position, i.e. minimum loading on the gear if running alone between two fixed centre gears, or if sharing a load between two such gears (as is the case where the flex-shaft gear is one of a number of planets in an epicyclic gear) to a position in which an equal share of the load is taken. Further, if there is any tendency for the load not to be uniformly distributed over the face width of the gear, i.e. not central, due for example to a helix error, the shaft will deflect in a manner which compensates for the error (even if both sun and annulus have errors of different sense and magnitude).

It will be appreciated that the theoretical ideals of absolute rigidity are not achieved in practice but the rigidities or stiffnesses may be determined theoretically and as long as they are greater in magnitude than that of the shaft the invention will be found practicable.

The invention is applied to an idler gear forming part of a train of parallel shaft gears in the same manner as it is to epicyclic gears.

The invention is now particularly described with reference to the accompanying drawings, wherein:

FIGURE 2 is a sectional elevation of a star step-up gear;

FIGURE 4 is a view similar to FIGURE 2 showing a planetary reduction gear; and

FIGURE 5 is a view similar to FIGURE 2 showing a solar step-up variable ratio gear.

Figure 1:
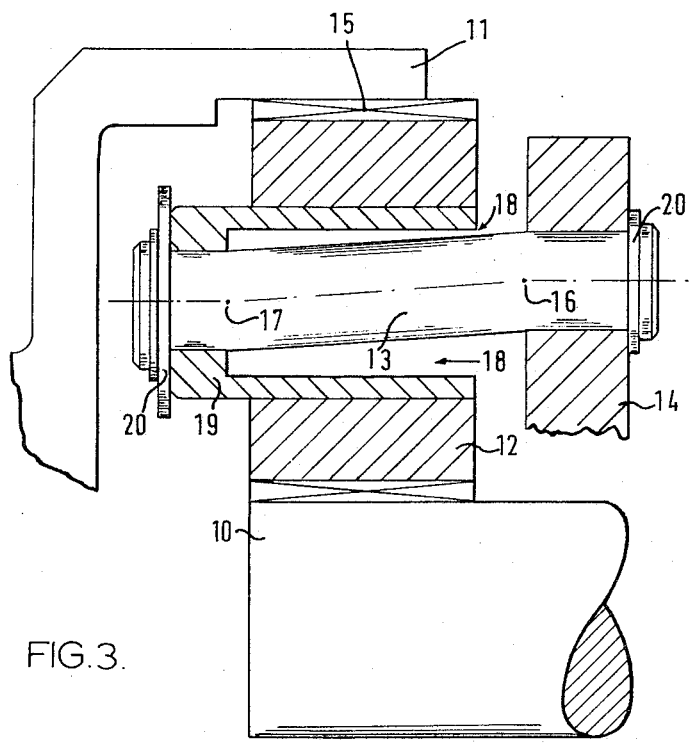
FIGURE 1 is a fragmentary and diagrammatic part-sectional elevation of an epicyclic gear with flexure grossly exaggerated for the purpose of illustration.

Referring first to FIGURE 1 which illustrates the invention diagrammatically, the epicyclic gear broadly comprises a sun wheel 10, an annulus gear ring 11, and a plurality of planets 12 which mesh with both sun and annulus. The planets are supported on spindles 13 fast with a carrier 14. The effect of the gear depends upon whether the sun, annulus or carrier is the input or output, and which of these three is fixed either permanently or optionally. In any event, the centre 15 of the planet teeth, measured axially is at an equal distance from the points 16 and 17 which lie in planes containing the point of emergence of the spindle 13 from the carrier and the planet respectively so that the couples will be equal as hereinbefore explained.

Likewise, for the reasons hereinafter explained, the planet does not skew if mis-aligned but deflects the shaft as shown in the figure, until each of the planets is equally loaded. The annular gap 18 permits this. It will be appreciated that in practice the deflection involved will be relatively slight.

The planet 12 may seat directly on spindle 13, or as shown in FIGURE 1, may seat and be journalled on a sleeve 19 which provides the gap. In this case the sleeve is fast with the spindle.

The spindle is a press or shrink fit in the carrier 14 and possibly in the sleeve 19 but a system of circlips 20 is also used as a precaution against damage through fit relaxation.

Figure 3:
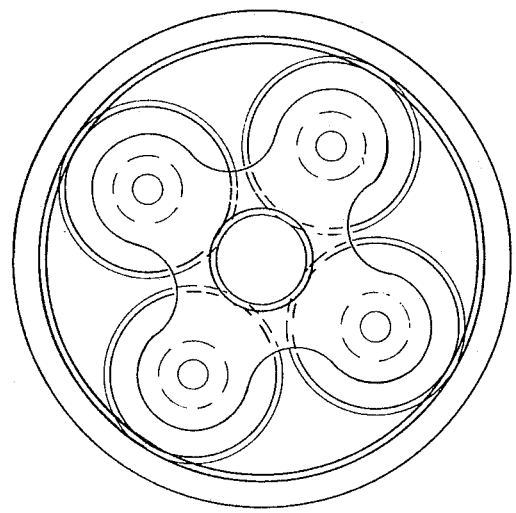
FIGURE 3 is a view taken on the line 3—3 FIGURE 2.

The practical embodiment shown in FIGURES 2 and 3 uses spur teeth and has the planet carrier 114 fast with the stationary casing. This embodiment is substantially similar to FIGURE 1 and in this case the input is annulus 111 and the output is sun wheel shaft 110.

It will be noted that the end of each sleeve opposite to the end fast with the spindle is counterbored and arranged close to the carrier: in the space thus created is located an O ring 121.

The O ring acts primarily as a seal, to limit escape of lubricant, but also acts to damp resonant vibration.

The gear shown in FIGURE 4 is generally similar to that in FIGURE 3, and the input is the sun wheel 210, the output is the planet carrier 214, and the reactionary member is the stationary annulus 211. The gear uses single helical teeth.

The gear shown in FIGURE 5 is again similar to those in FIGURES 1–4 and again uses single helical teeth: in this case the annulus 311 is the output and the planet carrier 314 is the input. The sunshaft 310 carries a pair of sunwheels 322, 323 which constitute variable reaction members and are drivable by corresponding motors 324: each motor drives via a shaft 325 splined in the hub of the corresponding pinion 326 which is journalled at each end in the casing.

In each case in FIGURES 2-5, the planets 112, 212, 312, have gaps to permit the spindles to deflect as indicated in FIGURE 1. It will be appreciated that the degree and direction of deflection may be different in each case.

I claim:

1. An epicyclic gear set having a planet carrier provided with a plurality of spindles fast therewith, each spindle carrying a planet wheel rotatable thereon, said planet wheel and spindle making contact and being relatively rigid with one another at a position symmetrically located on the opposite side of the axial centre of the wheel teeth to the point at which the spindle is fast and rigid with said carrier, and being spaced apart between said points, whereby the spindle may flex under equal couples applied as a result of unequal loads on opposite points of the wheel, and assume a deflected position in which said loads are equalised.

2. A gear train comprising three meshed gears, the intermediate one of which is carried on a spindle, said spindle extending through said intermediate gear and being spaced therefrom by an annular gap extending axially on the whole of the length of the meshed portion of the gear, said spindle rotatably supporting the gear on one side of said portion and, at the other end of the spindle, being rigid with a mounting, the spindle length between said ends being adapted to flex relative to said ends to allow the gear to assume a position under equal load from the first and third gears.

References Cited by the Examiner

UNITED STATES PATENTS

| 2,027,592 | 1/1936 | Hoffman et al. | 74—410 X |
| 3,218,889 | 11/1965 | Jarchow | 74—801 |
| 3,244,020 | 4/1966 | Breuer | 74—411 |

FOREIGN PATENTS

| 718,645 | 11/1954 | Great Britain. |
| 253,321 | 2/1948 | Switzerland. |

DAVID J. WILLIAMOWSKY, *Primary Examiner.*

L. H. GERIN, *Assistant Examiner.*